Patented Oct. 31, 1933

1,933,228

UNITED STATES PATENT OFFICE 1,933,228

RECOVERY OF PULP FROM WASTE PAPER

Francis H. Snyder, Niagara Falls, N. Y., and Stanley F. M. Maclaren, Niagara Falls, Ontario, Canada, assignors to Industrial Research, Limited, Niagara Falls, Ontario, Canada.

No Drawing. Application November 18, 1931
Serial No. 575,972

12 Claims. (Cl. 92—9)

This invention relates to the recovery of pulp from waste paper such as newsprint, bookprint, old magazine stock and the like.

This application is a continuation-in-part of our copending application Serial No. 574,227, filed November 10, 1931.

The principal object of the present invention is to provide a simple, economical, and commercially practicable process of converting waste paper of the above referred to character into a high grade of pulp.

An important object of the invention is to provide a process of recovering pulp from waste paper of the above referred to character wherein the time required for completely deinking the paper is materially less than in similar processes heretofore employed.

A further object of the invention is to provide a process of recovering a high grade of pulp from waste paper wherein the yield of reclaimed fibrous material from the stock treated is substantially higher than in similar processes heretofore employed.

Another object of the invention is to provide an efficient process of recovering a high grade of pulp from waste paper wherein high temperature treatment and the employment of steam are avoided.

Other objects and advantages of the invention will become apparent during the course of the following description.

We have discovered that printed waste paper such as old newsprint, bookprint and magazine stock can be rapidly and thoroughly deinked and a superior quality of white pulp obtained therefrom by subjecting such waste paper in dilute suspension to a mechanical beating action in the presence of a soluble salt consisting of an alkali metal combined with an acid group which consists of an amphoteric metal oxide, such as an alkali metal silicate, aluminate, phosphate, titanate or borate. We have further found that the speed of action of the soluble salt may be increased by employing in conjunction therewith a surface tension reducing material or wetting agent and preferably a soap-forming fatty body.

In the practice of our process the waste paper to be treated is preferably subdivided into relatively small pieces, as by passing the waste paper through a conventional shredding machine. The exact size of the pieces is not material, it merely being advisable to so subdivide the waste paper as to avoid the presence in the mass of thick bulky masses which might damage the beater in which the waste paper is subsequently treated.

After the paper has been shredded, if this has been found to be desirable, it is introduced into an aqueous solution in an operating beating engine, preferably an ordinary open paper beater. In practice, the beater is first charged with sufficient water to provide a suspension of approximately from 3 to 4 per cent. solid content when the paper is added and with this water is mixed a suitable amount of a soluble salt consisting of an alkali metal combined with an acid group which consists of an amphoteric metal oxide. After the soluble salt has been completely dissolved, the shredded paper is introduced into the beater and, if a surface tension reducing agent is to be employed, such agent is promptly added to the beater, preferably by introducing it at a point beyond the beater wheel so that it will be thoroughly mixed with the mass by the time it returns to the entry side of the beater wheel.

The mass in the beater is circulated around the beater and subjected to the action of the beater wheel until "shiners" have practically disappeared from the mass. Further beating produces an excess of fine fiber which may be lost to a substantial extent in the subsequent treatment or may introduce complicating factors into the later steps of the process. Ordinarily the beating of the mass for about fifteen minutes is sufficient to completely free the fiber from printer's ink and other extraneous material present. After the completion of the beating action the mass is withdrawn from the beater and the excess liquid is separated from the fiber content and the latter is thoroughly washed with an excess of water. The separation and washing of the fibers may most advantageously be accomplished by passing the mass from the beater directly to a continuous filter of the Oliver type. In this type of filter a perforated drum rotates in a tank containing the suspension and by the action of reduced atmospheric pressure or suction the liquid is drawn through the perforations leaving a mat of fiber on the surface of the drum, through which subsequent filtering takes place. During the rotation of the drum the mat of fiber on the surface thereof is subjected to sprays of water, following which the mat is scraped off.

After the separation and washing, the fiber may be conveyed to a storage chest for use in the manufacture of paper or it may be suspended in water and passed over a drum or screen to form laps or sheets of pulp. While the foregoing process ordinarily results in the production of an extremely white pulp, it may be desirable in some instances to subject the recovered fiber to a bleaching operation in which case it is advantageous to pass the fiber from the continuous filter to a chest where the fiber is subjected to the action of a bleaching agent, say a one per cent. chlorine bleach, after which the bleached fiber is thoroughly washed with water. This washing may also advantageously be conducted by the use of a continuous filter of the Oliver type although other conventional means may be employed as will be apparent.

As the treating agent to be employed during the mechanical beating of the waste paper in the paper beater or the like, we prefer to use a sodium silicate and especially water glass ($Na_2Si_4O_9$) although the normal sodium silicate ($Na_2SiO_3$) may advantageously be used. Another sodium silicate which is commercially available and suitable for use is the so-called "3.25 silicate" ($Na_2O.3.25SiO_2$). Other soluble silicates will serve as the treating agent but since water glass is readily available at an advantageous price and since this material is thoroughly satisfactory, its use is recommended.

In addition to the soluble silicates we have found that other soluble salts comprising an alkali metal combined with an acid group consisting of an amphoteric metal oxide may advantageously be employed as the primary treating agent and among the most suitable of these agents for use in the present invention may be mentioned the soluble aluminates, phosphates, titanates, and borates. For example, tri-sodium phosphate and sodium aluminate have been shown to be especially satisfactory. In addition, mixtures of the soluble salts may be employed. For example, a mixture of sodium silicate and sodium aluminate has been found to be advantageous in some instances. In fact, the use of mixtures of the salts is often desirable since the pH of the treating solution may be controlled to a marked degree by the selection of mixtures of the salts.

As stated above, we have found it advantageous to employ a wetting agent in conjunction with the soluble salt treating agent. We have also indicated that we prefer to use a soap-forming fatty body and among the materials which we have found to be most suited for use may be mentioned oleic acid, palm oil, rosin oil, sulfonated oils and the like. The use of such materials is trebly advantageous. In the first place, these materials act as wetting agents to reduce surface tension thereby facilitating the removal of the printer's ink from the fiber. Secondly, under the agitating action of the beater they serve as emulsifying agents for the linseed oil varnish of the printer's ink. Thirdly, these materials consist of or contain free fatty acid and this serves to lower the pH in the mass which appears to be of great advantage.

While we do not desire to be limited by any theory of operation, the extensive evidence which we have gathered as a result of exhaustive experiments points strongly to the conclusion that the carbon present in the printer's ink is deflocculated into infinitely small particles by the action of the treating agents and that these particles are taken up or surrounded by the micelles of the colloidal compound which is formed as a result of the hydrolysis of the treating agent in the solution. For example, when a soluble silicate is employed this material upon disassociation and hydrolysis in the aqueous bath yields micelles of silicic acid. Similar colloidal compounds are formed when the other soluble salts of the character referred to above are employed.

That the foregoing theory of operation is probably the proper one may be seen from a description of what actually takes place during the practice of the process. In the first place, in the conventional deinking processes heretofore employed the liquors which have been drawn off from the fibers have been extremely black as a result of the presence of the particles of carbon from the printer's ink present therein. During the initial period of the operation of the present process there is a similar evidence of the presence of particles of free carbon in the mass. For example, during the first two or three minutes of treatment relatively large coarse particles of carbon are set free from the fiber and some of these show on top. However, shortly thereafter these coarse particles disappear and the color of the liquor instead of being black has become a bluish gray. Moreover, there is no evidence of the presence of any free carbon. This is demonstrated by stirring a porcelain rod in the mass and removing it. Instead of coming out of the mass with a large amount of carbon particles adhering thereto as would be true during the first part of the process and as would also be true in the prior deinking processes, the porcelain rod is substantially free from carbon particles. The same test may be made by inserting the hand into the mass, leaving it for a few moments and withdrawing it. Instead of the hand being covered with particles of carbon as would be expected from the teachings of prior processes, it is found that the hand is substantially free from particles of carbon. A similar test may be made by reaching into the mass and removing a handful of the fiber and squeezing from it excess liquid. As a result of this test the fiber appears to be substantially white and free from particles of carbon.

Further evidence that the carbon is removed in infinitely small deflocculated particles of carbon surrounded by a film of the colloidal material formed is to be found by drawing off some of the liquor from the beater after it has been operating for a reasonable period and examining this liquor. Instead of being black in color and containing suspended particles of free carbon which would settle upon standing, the liquor is of opalescent bluish gray color and no particles of free carbon appear. Upon standing the micelles containing the fine particles of carbon will settle in part but no free carbon is precipitated. Moreover, upon dilution or upon the addition of an acid no free carbon is separated.

Perhaps the most convincing evidence of the correctness of our theory as expressed is to be found in the fact that the removed carbon carried as colloidally fine particles by the micelles of the colloidal material will pass through ordinary filter paper. This feature is not only interesting from a theoretical standpoint but is extremely valuable from a practical standpoint as will be apparent. For example, the carbon particles removed during the treatment of waste paper by the ordinary process will deposit on and quickly clog a filter with the result that the recovery of clean fiber from the liquor is rendered extremely difficult.

The following specific description of the preferred practice of our process may be considered as illustrative of the invention:

Waste newsprint after being freed by conventional mechanical treatment from any extraneous material which may be present is shredded in a conventional shredding machine. Approximately one ton of the shredded paper is thereupon added to from 25 to 30 tons of water in an open paper beater, the water containing approximately 300 pounds of water glass in solution. Immediately following the introduction of the shredded paper into the solution in the beater, about 50 pounds of oleic acid are introduced into the mass, preferably at a point just beyond that where the mass leaves the beater wheel. The mass is subjected to the beating action of the beater for approximately 15 minutes, or slightly less depending upon the proportion of "shiners" present. This treatment may advantageously be conducted at ordinary atmospheric temperature, but for standardizing the practice we recommend a temperature of about 25° C. Following the treatment in the beater the mass is withdrawn and passed to a continuous filter of the Oliver type where the liquid is drawn off and the fiber recovered and washed. Thereupon, the fiber may be bleached, if desirable, or passed directly to a storage chest or to a suitable machine for forming laps or sheets of pulp.

The foregoing preferred embodiment may be varied by employing approximately 25 tons of water, 125 pounds of tri-sodium phosphate and 50 pounds of oleic acid for each ton of paper treated. A further modification consists of the use of from 175 to 200 pounds of sodium aluminate, from 25 to 50 pounds of a soap-forming fatty body and from 25 to 30 tons of water to each ton of waste paper treated.

The pulp produced as a result of the foregoing treatment, even without bleaching, is remarkably white in color and is practically entirely free from particles of carbon as is shown by microscopic examination. Moreover, the pulp is of superior quality as regard to fiber strength since the treatment has no deleterious action upon the strength of the fibers present. Moreover, the yield of fibrous material is usually high as compared with the yield of fibrous material from similar processes heretofore used, being approximately 10 per cent. higher than the yield obtained in the practice of the most successful and efficient process of which we are aware. Finally, the process is especially adapted for commercial exploitation in view of the short time required for the completion of the process, the low cost of operation, the unusually high yield, and the avoidance of the necessity for conducting the process at high temperatures or the utilization of steam.

The term "salt of an amphoteric metal acid" as employed in the appended claims is to be understood as referring to a salt in which an amphoteric metal is present in the acid radical, such as a silicate, aluminate, phosphate, titanate, and borate.

While we have described in detail the preferred practice of our process it is to be understood that the details of procedure may be variously modified without departing from the spirit of the invention or the scope of the subjoined claims.

We claim:

1. The process of reclaiming fiber from waste paper which comprises the step of subjecting a dilute suspension of the waste paper to a mechanical beating action in the presence of a soluble salt of an amphoteric metal acid selected from the group consisting of alkali metal aluminates and titanates.

2. The process of reclaiming fiber from waste paper which comprises the step of subjecting a dilute suspension of the waste paper to a mechanical beating action in the presence of an alkali metal aluminate.

3. The process of reclaiming fiber from waste paper which comprises the step of subjecting a dilute suspension of the waste paper to a mechanical beating action in the presence of an alkali metal salt of an amphoteric metal acid, and an acidic soap-forming fatty body.

4. The process of reclaiming fiber from waste paper which comprises the step of subjecting a dilute suspension of the waste paper to a mechanical beating action in the presence of an alkali metal silicate, and an acidic soap-forming fatty body.

5. The process of reclaiming fiber from waste paper which comprises the step of subjecting a dilute suspension of the waste paper to a mechanical beating action in the presence of an alkali metal aluminate, and a surface tension reducing agent comprising a soap-forming fatty body.

6. The process of reclaiming fiber from waste paper which comprises the step of subjecting a dilute suspension of the waste paper to a mechanical beating action in the presence of an alkali metal phosphate, and a surface tension reducing agent comprising a soap-forming fatty body.

7. The process of reclaiming fiber from waste paper which comprises the step of subjecting a dilute suspension of the waste paper to a mechanical beating action in the presence of a sodium silicate, and free oleic acid.

8. The process of reclaiming fiber from waste paper which comprises subdividing the waste paper, subjecting a dilute aqueous suspension of the resulting paper to a mechincal beating action in the presence of an alkali metal salt of an amphoteric metal acid and an acidic soap-forming fatty body, separating the fibrous material from the mass and washing the reclaimed fiber.

9. The process of reclaiming fiber from waste paper which comprises subdividing the waste paper, subjecting a dilute aqueous suspension of the resulting paper to a mechincal beating action in the presence of an alkali metal aluminate, separating the fibrous material from the mass and washing the reclaimed fiber.

10. The process of reclaiming fiber from waste paper which comprises subjecting a dilute aqueous suspension of the waste paper to a mechanical beating action in the presence of a silicate of sodium and an acidic soap-forming fatty body, and separating and washing the thus treated fibrous material.

11. The process of reclaiming fiber from waste paper which comprises shredding the waste paper, subjecting a dilute aqueous suspension of the shredded paper to a mechanical beating action in the presence of water glass and free oleic acid, passing the resulting mass to a continuous type filter to recover the fibrous content from the mass, and washing the thus recovered fiber.

12. In a process of reclaiming fiber from waste paper the improvement which comprises subjecting the waste paper in wet pulp form to the action of an alkali-metal salt of an amphoteric metal acid and an acidic soap-forming fatty body.

FRANCIS H. SNYDER.
STANLEY F. M. MACLAREN.